United States Patent
Fugel et al.

(10) Patent No.: US 6,883,968 B2
(45) Date of Patent: Apr. 26, 2005

(54) SHAPED PART MADE FROM A STRIP

(75) Inventors: Wolfgang Fugel, Nuremberg (DE); Leo Muntnich, Aurachtal (DE); Hartwig Waldert, Aisch (DE)

(73) Assignee: Ina-Schaeffler KG (DE)

( * ) Notice: Subject to any disclaimer, the term of this patent is extended or adjusted under 35 U.S.C. 154(b) by 176 days.

(21) Appl. No.: 10/221,421

(22) PCT Filed: Jan. 31, 2001

(86) PCT No.: PCT/EP01/00995

§ 371 (c)(1),
(2), (4) Date: Sep. 23, 2002

(87) PCT Pub. No.: WO01/69099

PCT Pub. Date: Sep. 20, 2001

(65) Prior Publication Data

US 2003/0077017 A1 Apr. 24, 2003

(30) Foreign Application Priority Data

Mar. 10, 2000 (DE) .......................... 100 11 651

(51) Int. Cl.⁷ .............................................. F16C 33/54
(52) U.S. Cl. ...................................................... 384/577
(58) Field of Search ................................ 384/577, 578, 384/579, 502; 277/496, 497, 498, 499

(56) References Cited

U.S. PATENT DOCUMENTS

| 2,729,520 A | 1/1956 | Ritchie et al. |
| 3,368,854 A | 2/1968 | Adams et al. |
| 3,399,008 A | 8/1968 | Farrell et al. |
| 3,787,059 A | * 1/1974 | McCormick ................. 277/496 |
| 6,017,151 A | * 1/2000 | Heinemann .................. 384/502 |
| 6,394,659 B1 | * 5/2002 | Earthrowl .................... 384/572 |

FOREIGN PATENT DOCUMENTS

| DE | 7035271 | 10/1970 |
| DE | 2406361 | 8/1975 |
| DE | 3041860 | 6/1982 |
| DE | 3526625 | 1/1987 |
| DE | 3709039 | 10/1988 |
| DE | 3735070 | 4/1989 |
| DE | 4236649 | 5/1994 |
| DE | 4425345 | 1/1996 |
| DE | 4402854 | 6/1997 |
| DE | 19618065 | 11/1997 |
| DE | 19739452 | 3/1999 |
| DE | 119753583 | 6/1999 |
| DE | 19839486 | 3/2000 |
| DE | 19844203 | 3/2000 |
| DE | 19907571 | 9/2000 |
| EP | 0013628 | 7/1980 |
| EP | 0802338 | 10/1997 |
| JP | 08128446 | 5/1996 |

* cited by examiner

Primary Examiner—Lenard A. Footland
(74) Attorney, Agent, or Firm—Muserlian, Lucas and Mercanti

(57) ABSTRACT

A shaped part made from a strip, peripherally contiguous ends of the strip being firmly connected to each other is characterized in that a recess (6) is arranged on one end of the strip (1) and an over-dimensioned projection (7) is arranged on the other end of the strip (1), and after bending round of the strip (1), said ends are fit into each other in axial or radial direction so that through a plastic deformation, an undetachable interference fit results between said ends.

8 Claims, 2 Drawing Sheets

SHAPED PART MADE FROM A STRIP

This application is a 371 of PCT/EP01/00995 filed Jan. 31, 2001.

FIELD OF THE INVENTION

The invention concerns a shaped part made from a strip, peripherally contiguous ends of the strip being undetachably connected to each other. The invention further concerns a method of making shaped parts.

BACKGROUND OF THE INVENTION

It has been known for a long time to make such shaped parts as bearing cages for rolling bearings. In a first step, pockets for receiving rolling elements are made in a flat metal strip by punching. A suitable length for accommodating the desired cage diameter is cut from the metal strip and rolled into a cylindrical shape so that the two joint edges of the strip touch each other. To finish the cage, the adjoining joint edges are then connected to each other by welding (DE 15 52 099).

A drawback of this method is that the joint welding results in the formation of welding mounds that have to be removed in a subsequent work step because, otherwise, they can damage the bearing. A further drawback is that so-called interruptions occur due to joint welding. These interruptions are to be understood as inwardly extending geometric irregularities that can occur in different gradations. The spectrum of the interruptions begins within the surface roughness and ends in a depth in which the interruptions can have a detrimental effect on the operation of the component i.e., in the extreme case, the component can become unserviceable. Such interruptions produce a notch effect i. e., due to the sudden change of the cross-section or of the surface contour, they cause a disturbance in the even flow of force in the component. A concentration of stress is produced at these notches and a stress peak is formed at the notch root. This notching is attended by two effects. Firstly, the load-bearing cross-section is reduced and, secondly, loading is concentrated at the notch root. This notch effect within the weld joint between the two joint edges of the cage has a particularly negative influence on the fatigue strength of the cage under high load conditions.

SUMMARY OF THE INVENTION

It is therefore an object of the invention to provide a novel connection for a shaped part made from a strip which guarantees a reliable fatigue strength even under conditions of maximum load.

The invention achieves the above object by the fact that a recess is arranged on one end of the strip and an over-dimensioned projection is arranged on another end of the strip, which ends, after bending round of the strip, are fit into each other by application of a force in an axial or in a radial direction so that through a plastic deformation, an undetachable interference fit results.

The particular advantage of a shaped part made according to the invention is that welding is replaced by this novel method of joining the ends of the strip. The aforesaid drawbacks that are connected directly with the welding mound therefore do not even occur in the first place. A further advantage is to be seen in the fact that it is also possible to use materials that cannot be joined to each other by welding or such materials that are very difficult to join by welding.

In the meaning of the invention, the term "shaped part made from a strip" is to be construed very broadly, that is to say, it covers shaped parts for the most different of applications. Thus, in one example, the shaped part is a rotationally symmetric rolling bearing cage comprising crossbars and side rings, and at least one side ring comprises a recess on one end and a projection on another end.

According to another feature of the invention, the shaped part is a pulser wheel for an equipment for measuring a rotational speed of a rotating component that comprises circumferentially uniformly spaced counting sections that cooperate with a sensor unit, the pulser wheel being connected to the rotating component.

According to a further feature of the invention, the recess is configured as a reception bore and the projection is configured as a cylinder. The shape of the recess and the projection can be chosen at will, but particular preference is given to shapes that can be made in as simple and inexpensive a manner as possible and that are well suited for inter-insertion.

According to a still further feature of the invention, the strip is made of a ferrous material, of copper or a copper alloy, of aluminium or an aluminium alloy or of a plastic.

A method of the invention for making a shaped part in the form of a cage comprises the steps of: profiling an endless starting strip by a shaping procedure to achieve the desired, later cross-section, punching out pockets for receiving rolling elements, providing guide and/or retention surfaces on the pockets if necessary, cutting off an adequate length of the strip, making a recess on one end of the strip and a projection on an opposite end of the strip, bending the strip into an annular shape and axially or radially pressing the projection into the recess so that a cage of stable shape is formed.

A similar method of the invention for making a pulser wheel comprises the steps of: punching out pockets acting as counting sections in an endless starting strip, cutting off an adequate length of the strip, making a recess on one end of the strip and a projection on an opposite end of the strip, bending the strip into an annular shape and axially or radially pressing the projection into the recess so that a pulser wheel of stable shape is formed.

The invention will now be described with reference to examples of embodiment shown in the appended drawings.

DETAILED DESCRIPTION OF THE DRAWINGS

Figure 1:
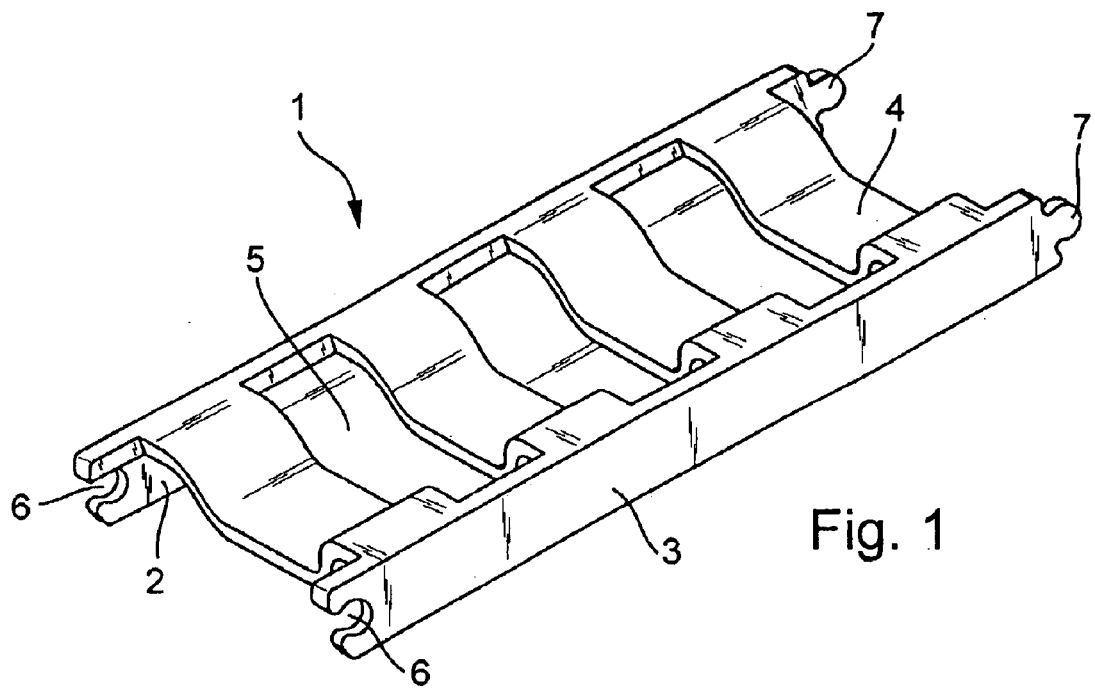
FIG. 1 is a perspective representation of a piece of strip.

The strip shown in FIG. 1 and identified at 1 comprises the side members 2 and 3 that are connected to each other by uniformly spaced crossbars 4 so that pockets 5 are formed. The strip 1 is profiled so that, after it has been bent round, an M-shaped cage is formed. Each of the side members 2 and 3 comprises a recess 6 configured as a bore on one end and a projection 7 configured as a cylinder on another end. The projection 7 is over-dimensioned compared to the recess 6 so that a material squeezing caused by the insertion of the projection 7 into the recess 6 results in the formation of an undetachable connection. The pressing of the projection 7 into the recess 6 is achieved in that the two side members 2 and 3 are placed axially next to each other at an offset corresponding to their width and are then pressed in an axial direction into each other by application of a force.

Figure 2:
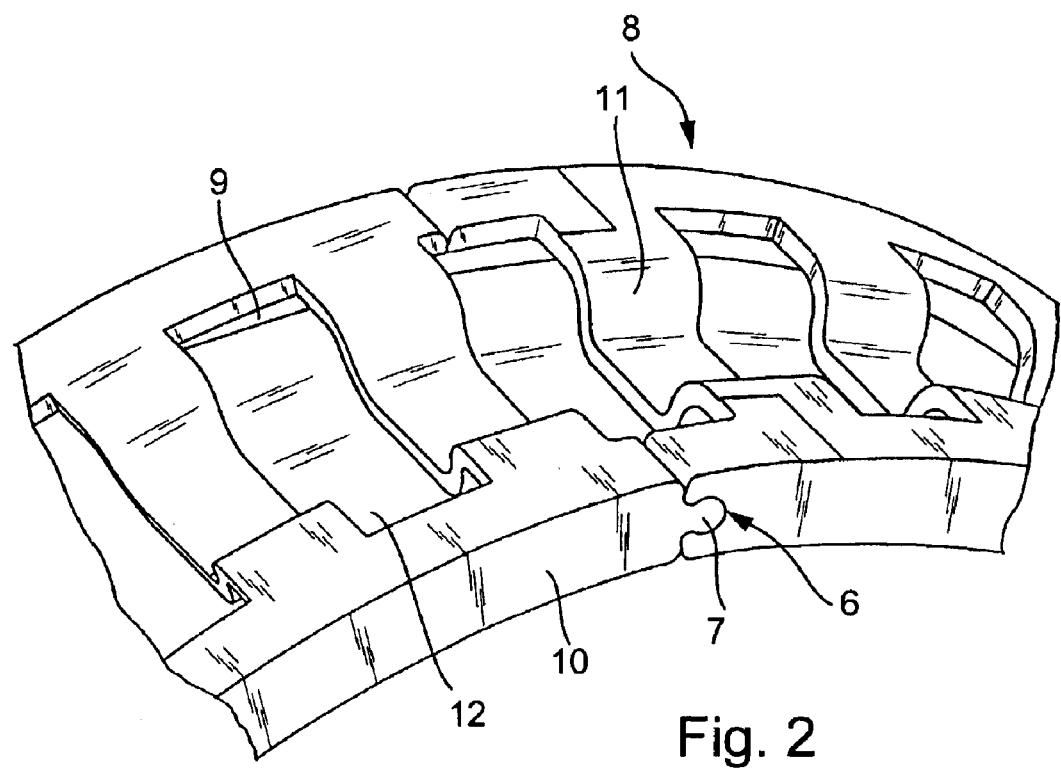
FIG. 2 is a detail from a perspective representation of a rolling bearing cage of the invention.

FIG. 2 is a partial representation of a bearing cage identified at 8 and comprising the side rings 9 and 10 that are connected to each other by crossbars 11 so that pockets 12 for receiving rolling elements are formed. The crossbars 11 are profiled so that, starting from the two side rings 9 and 10, they extend at first parallel to the longitudinal bearing axis, not shown, and then slope down radially inward to unite into a last portion that extends parallel to the bearing axis. Similar to the strip 1 shown in FIG. 1, the cage 8 comprises on the adjoining ends of each of its side rings 9 and 10, the recess 6 and the projection 7 respectively. When the cage 8 has been bent round, the projection 7 is pressed into the recess 6 in this embodiment, too, in an axial direction.

Figure 3:
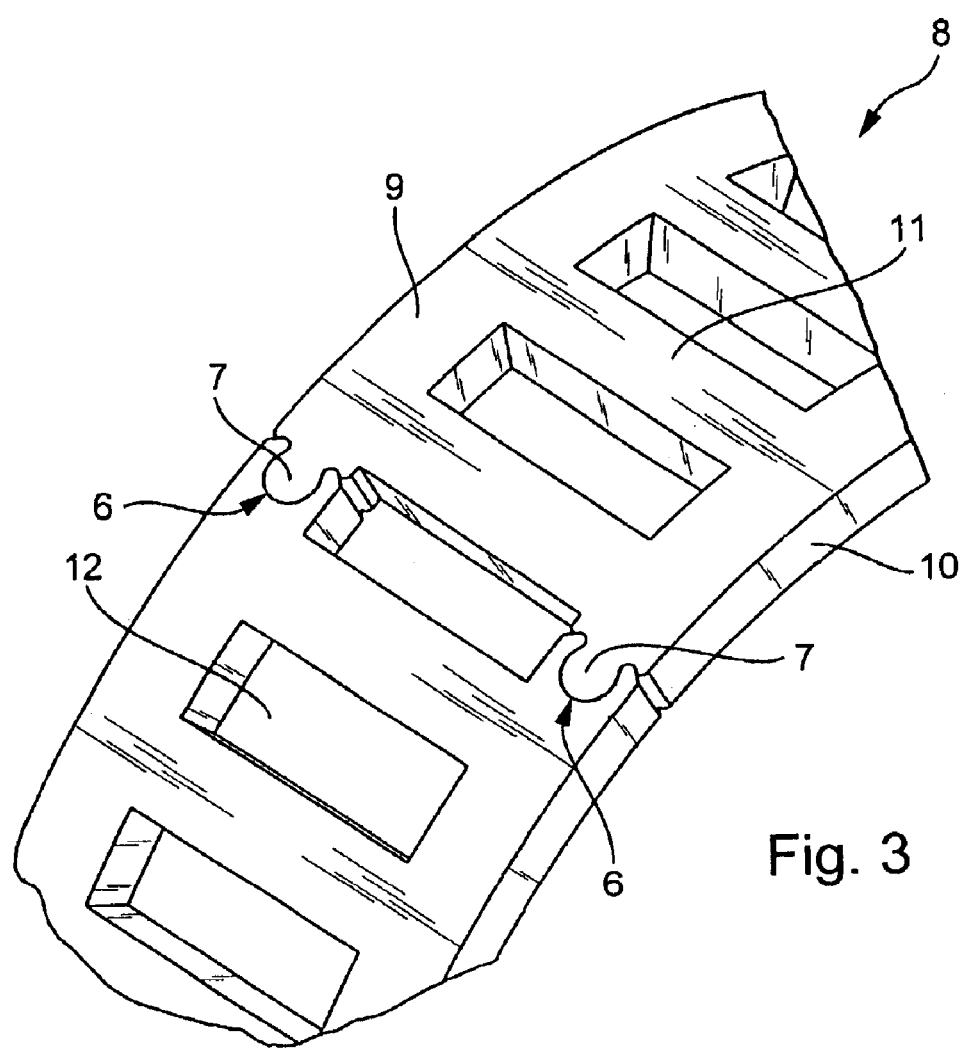
FIG. 3 is a detail from a perspective representation of a further rolling bearing cage of the invention.

In contrast, the cage 8 of FIG. 3 comprising the recesses 6 and the projections 7 is configured so that, after it has been bent round, the recesses 6 and the projections 7 have to be inserted into each other by a radial displacement. This means that the joint edges are at first disposed at a radial offset to each other corresponding to the thickness of the side rings 9, 10 and then pressed into each other by application of a force. In this embodiment, too, a plastic deformation leads to the formation of an undetachable material connection between the two joint edges.

In the described embodiments, the joint edges are arranged in the region of a pocket 5, 12. However, it is equally possible to arrange them in the region of a crossbar.

What is claimed is:

1. A shaped part made from a strip, peripherally contiguous ends of the strip being undetachably connected to each other, wherein a recess is arranged on one of said ends of the strip and an over-dimensioned projection is arranged on another of said ends of the strip, which ends, after bending round of the strip, are fit into each other by application of a force in one of an axial and a radial direction so that through a plastic deformation, an undetachable interference fit results between said ends.

2. A shaped part of claim 1 made as a rotationally symmetric rolling bearing cage comprising crossbars and side rings, and at least one side ring comprises a recess on one end and a projection on another end.

3. A method of making a cage of claim 2, said method comprising the steps of: profiling an endless starting strip by a shaping procedure to achieve a desired, later cross-section of the cage, punching out pockets for receiving rolling elements, cutting off an adequate length of the strip, making a recess on one end of the strip and a projection on an opposite end of the strip, bending the strip into an annular shape and pressing the projection into the recess in one of an axial and a radial direction to form a cage of stable shape.

4. A method of claim 3, wherein at least one of guide surfaces and retention surfaces are configured on the pockets.

5. A shaped part of claim 1 made as a pulser wheel for an equipment for measuring a rotational speed of a rotating component that comprises circumferentially uniformly spaced counting sections that cooperate with a sensor unit, the pulser wheel being connected to the rotating component.

6. A method of making a pulser wheel of claim 5, said method comprising the steps of: punching out pockets acting as counting sections in an endless starting strip, cutting off an adequate length of the strip, making a recess on one end of the strip and a projection on an opposite end of the strip, bending the strip into an annular shape and pressing the projection into the recess in one of an axial and a radial direction to form a pulser wheel of stable shape.

7. A shaped part of claim 1, wherein the recess is configured as a reception bore and the projection is configured as a cylinder.

8. A shaped part of claim 1, wherein the strip is made of one of a ferrous material, copper, a copper alloy, aluminium, an aluminium alloy and a plastic.

* * * * *